| [72] | Inventor | Edward L. Braun<br>1920 Manning Ave., Los Angeles, Calif. 90025 |
|---|---|---|
| [21] | Appl. No. | 721,681 |
| [22] | Filed | Apr. 16, 1968 |
| [45] | Patented | July 20, 1971 |

[54] CREDIT CARD BANKING SYSTEM
25 Claims, 3 Drawing Figs.

| [52] | U.S. Cl. | 340/152 |
|---|---|---|
| [51] | Int. Cl. | H04q 9/00 |
| [50] | Field of Search | 340/152; 179/2 CA |

[56] References Cited
UNITED STATES PATENTS

| 3,184,714 | 5/1965 | Brown, Jr. et al. | 340/149 A |
|---|---|---|---|
| 3,308,238 | 3/1967 | Brothman et al. | 340/152 |
| 3,315,230 | 4/1967 | Weingart | 179/2 CA |
| 3,351,919 | 11/1967 | Milford | 179/2 DP |
| 3,407,387 | 10/1968 | Looschen et al. | 340/152 |

Primary Examiner—Donald J. Yusko
Attorney—Smyth, Roston & Pavitt

ABSTRACT: A system is disclosed in which one or more central stations can communicate with peripheral stations as to information held or controlled by the central station for access by authorized users only. The central station verifies the existence of paired codes in a memory bank of the central station when set into a peripheral station, before permitting access. Specifically, accounts are kept secure in this manner, permitting reduction of credit balance or increase of debit balance only to those in possession of the paired code associated with the account. Verification permits transfer of commodities or services at the location of the peripheral station with immediate updating of the centrally stored account balance. Various types of input and output devices as controlled by a peripheral station are disclosed.

CREDIT CARD BANKING SYSTEM

The present invention relates to a system in which a central station or stations cooperate, particularly communicate with a plurality of remotely positioned peripheral stations. The specific purpose of the communication is to affect stored credit or debit balances in the central station with return information to be provided to the peripheral station as to the success or degree of success with which the transfer has been or could be made.

Two major developments in the area of financial transactions have occurred in the recent past. One development can be characterized as computerization in the area of financial transactions in that the bookkeeping procedure and accounting operations are carried out to an increasing degree by computers. Printed or written ledger sheets, balance sheets, etc., keeping track of the account of account holders in an establishment have not been completely dispensed with, nevertheless accounting information is stored primarily now on records holding relevant information in computer legible form. Magnetic tape, punched cards, etc., are the usual means for such files.

The second major development referred to here is the increased widespread use of credit cards; the purpose of such cards is primarily to serve as an identification of the user as a person who is entitled to credit or to a certain amount of credit. Additionally the cards often provide account number information in coded form. The use of credit cards, however, does not simplify bookkeeping procedure; quite to the contrary, it is a convenience for the customer but requires bookkeeping to a considerable degree. Even though that bookkeeping may be computerized in the headquarters, of the commercial establishment which has issued credit cards for use in its retail outlets remote from the headquarters, there is nevertheless no direct link between the credit card system as used for the transfer of merchandise, for example, and the bookkeeping procedure in the central or headquarters. Moreover, a significant drawback of the credit card system as currently practiced is the relatively high rate of financial loss resulting from unauthorized use of credit cards.

It is one of the objects of the present invention to establish a "link" between credit card system as far as credit card use at the location of a desired transfer of, for example, merchandise or cash, is concerned and the center of bookkeeping holding information on the credit status, in the general sense, of the holder of the credit card. It is another object of the invention to extend the credit card system to the field of banking in general. Moreover, the system uses the principal characteristics of the credit and card system which is the implied "promise to pay" by the card holder and modifies it in (1) making the card itself a convenience rather than a necessity for offering that promise, (2) and/or permitting selective conversion of that "promise to pay" by the holder into a "promise to pay" by a bank.

The contemplated symbiosis of credit card system and computerization of accounting is established in a manner providing maximum security for authorized users of credit cards as far as access to their account is concerned, particularly for purposes of reducing the credit balance, or incrementing the debit balance as the case may be.

The peripheral station of the system can be placed in a manned or an unmanned environment depending on the variety of uses and of types of financial transfers or checks to be caused by means of that specific peripheral station. The peripheral stations can be placed at "strategic" places, where the transfer of commodities or the rendering of services is desired, on a cashless basis and remote from places which could directly (personally) guarantee the credit of the transferee. The peripheral station can be restricted in its use for communication with a particular central station or with a variety of different types of central stations such as banks, department stores, franchisors, etc., but the restrictions of use are not inherent in the basic principle employed so that different types of peripheral stations are compatible among each other as to communication with the same as well as different central station or stations. The system of the present invention is particularly designed to operate on a common principle adaptable without basic modification to a large variety of uses and permitting readily extension and cross-linking.

For example, several central stations may be provided for cooperation each with a basic set of peripheral stations, but some of these peripheral stations may in turn be provided for cooperation with several different central stations.

In essence the peripheral station is equipped with a means to accept account number information for a user which, for example, may be a card reader for reading and storing the account number information including, possibly, information identifying the establishment where the account is kept. Secondly, the peripheral station is provided with means to accept a security number code which is not part of the basic credit card information but is either kept on a separate card or which is keyed in by the user from his own memory. It is a basic aspect of the invention that the security code number is not known or used by, nor can it be demanded from, anybody other than authorized user responsible for the account. An account associated with a security code is, in the following, referred to as a secured account.

The system of the invention is designed such that an account can be secured up to the point that absolutely nobody but the authorized user has knowledge of that security number, not even personnel of the central establishment responsible for operation the central headquarters such as a bank or accounting departments need to know that number. While it is not necessary that security precautions be driven to the extreme, it is essential that it can be done by operation of the invention, the number of persons having knowledge of the respective association between an account number and its security code can be restricted arbitrarily.

The peripheral station is equipped with means, preferably this will be a keyboard, to set into the peripheral station information of a dollar amount intended to be transferred. Dependent upon the extent of use possible with the station and/or restrictions imposed upon it, it may also receive information on a payee account if the payee is not implied by the use of the specific peripheral station. That account does not have to be secured as it is an account which is being credited by the transfer.

These several items of information are assembled by the peripheral station and transferred to a central headquarters using, for example, telephone facilities. Again, the central headquarters may be implied from the specific peripheral station in that the latter can communicate only with a particular central station. Alternatively, the central station can be specifically addressed by operation of additional code information included in the secured account number, such as the banking identification or the like. The central station so addressed determines first whether there is a correlation between the number of the secured account and the security code which were keyed into the peripheral station and transmitted.

One can see here that the proper association of a secured account number and a security code exists only or has to exist only within a, possibly, special, protected memory of the computer. It does not exist in the peripheral station (unless keyed in by a user). "Protected in memory" is used here in a double sense. In one sense it means the physical protection through appropriate safety precautions, i.e., the memory can be in a safety vault. Secondly, the computer memory portion holding that information can readily be protected in that any program operating to have access to that memory position cannot possibly lead to an input-output device of the computer, thus making it impossible to withdraw that information from the computer and particularly from that protective memory.

Associative assignment of a security number and account number can be done in any manner restricting those having knowledge. The security code should preferably be totally unrelated to personal data of the user, his telephone number(s), social security number, etc., to make it impossible that by an "educated guess" the code can be deduced. Specifically, there must be no algorithm available to convert, for example, the account number (or any other "personal" number of the user) into the security code. On the other hand, security code numbers need not be unique with each customer, as uniqueness is required only in the combination with the particular account number. This leads to the question as to the size of the security code number. It should be sufficiently large, i.e., have sufficient digits to make any guess very improbable. The number of digits is basically arbitrary, but it is apparent that a one or two digit number could provide little (though some) security. Possibly one needs at least four digits. Selection can be made, for example, by way of drawing of a number so that only the authorized account user learns that number. The protected memory providing association between secured account number and security code can be read-only, associative memory. The account holder may then physically provide himself that association by loading the memory cell assigned to him with these two numbers, one being data, the other one being the addressing criteria. Nobody else may even learn that association.

As far as the dialog between a peripheral station and the central station is concerned, the basic return information provided by the central station to the peripheral station concerns the existence or nonexistence of the association of the code number pair: account number-security code within the secured m4mory of the central station. If not, the peripheral station received a reject signal indicating immediately unauthorized use of the secured account, otherwise the computer proceeds to process the information. This may involve basically the following types of operation; increasing debit or decreasing credit of the secured account by the dollar amount keyed into the peripheral station, coupled with a test whether a credit limit is not exceeding or funds are available. The amount debited to the secured account is possibly credited to another account. Completion of computer operation is signaled to the peripheral station as acceptance signal and this may terminate the communication as well as the operation of the peripheral station. Alternatively, a written record may be produced or merchandise or notes may be dispensed automatically. In an attended environment, merchandise may be transferred or cash or notes dispensed or received.

The central security code concept allows customers to prepare their own cards because now the control is not the card itself. The card is simply a convenience to provide the capability of connecting the customer to one of several central stations. In other words, a single card may hold account number information for several central stations. The card can be dispensed with entirely where provisions are made to punch or key all necessary information into a peripheral station manually.

Without intending to restrict the possibilities, the following principal types of peripheral stations and central stations can be used. The central station is a bank, the peripheral stations are a teller's aid. The teller performs all usual functions, particularly involving cash transfers but, in addition, he can control transfer of funds between accounts, the numbers of which are designated by the customer. For the account to be debited, the customer has to provide the proper security code (he may key the security code number into the station in a manner invisible to the teller if so desired).

An unattended "branch bank" permits any transfer between account not involving cash. The branch bank station may pertain to a particular bank, so that usage of that station is, in fact, restricted to persons having a secured account in that bank. The transfer of funds controlled from such a station will be immediate if both accounts are in the same bank, otherwise the bank where the customer has his secured account is instructed to effect transfer to the account on another bank. A multiple-branch banking station permits communication with the computer in any bank participating in the system.

The central computer of a bank is the central station as discussed thus far. A central station may also be the bookkeeping department of a department store, of a chain store or of a franchisor such as an oil and gasoline company, a chain drugstore, a chain food market, etc. The customer has credit with the outfit in form of a secured debit account. The peripheral stations then accept or reject requests for purchases on credit, rejection to occur if a credit limit has been exceeded, payment is overdue, or the like. The peripheral station in a retail outfit, for example, at the cashier's desk, may also permit the control of a transfer of funds between the bank account of a customer and the store account. A special case for the latter type of station used unattended may involve automatic dispensing of items of merchandise or specially secured notes. Aside from banking or sales, a peripheral station may control access to equipment or an area. A "credit" card then serves as a preliminary key, usable only in conjunction with the security code. Proper association is tested centrally, so that upon tampering with the peripheral station, an unauthorized person cannot learn combination of numbers that permit access.

While the specification concludes with claims particularly pointed out and distinctly claiming the subject matter which is regarded as the invention, it is believed that the invention, the objects and features of the invention and further objects, features and advantages thereof will be better understood from the following description taken in connection with the accompanying drawings in which:

GENERAL SYSTEM DESCRIPTION

Figure 1:
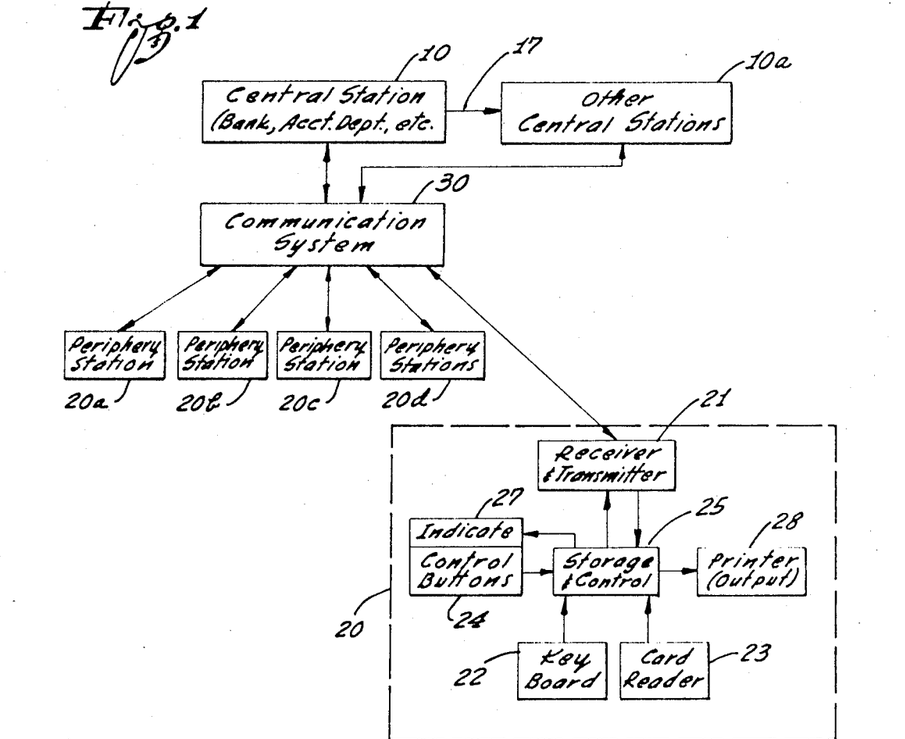
FIG. 1 is a block diagram for a layout of the system, in accordance with the preferred embodiment of the present invention.

Proceeding now to the detailed description of the drawings, in FIG. 1 thereof, there is illustrated a system with which the invention can be practiced with advantage. A central station 10 is provided for communication with a plurality of peripheral stations 20, 20a, 20b, etc. The central station 10 may, for example, be a bank, the central headquarters of a bank, the accounting department of a department store, accounting office of a merchandising outfit having a large number of retail outlets such as gas stations, ticket agencies, drug stores, food markets, or any other kind of store, commonly designated as chain stores, or the like. The essential feature, as far as the invention is concerned, is the fact that the central station 10 is equipped with a data processor such as a computer having a memory for storing information in a suitable format and holding such information available for immediate access. The information, of course, is relevant for any communication between the central station and the peripheral stations and involves primarily information identifying "authorized users" in relation to, for example, credit and/or debit balances, to be discussed in detail below.

In view of the adaptability of the communication system of the present invention for cross-linking and selective communication, other stations, symbolically denoted with reference numeral 10a, may be provided for alternative communication with the or some of the peripheral stations. In other words, some peripheral stations may be provided for exclusive communication with a central unit such as 10, other peripheral stations may communicate with one of the other stations 10a only. Still other peripheral stations may communicate with central unit 10 and with some or all of the other central stations 10a as well. In addition, cross communication between the central station 10 and other central stations through links 17 may complete a central system network in the general case.

The peripheral stations 20, 20a, 20b, etc., are coupled to the central station or stations 10 through suitable communication facilities such as a communication system 30. The communication system 30 may, for example, be the normal telephone system, a special wiring or other communication system, a teletype system or the like. Different stations may use different links. In the following, utilization of the regular telephone communications system will be presumed, as the capabilities of that system amply suffice not only for explaining operation of the inventive system, but because it is the most widely installed, i.e., existing communication system. The peripheral stations 20 are located at "strategic" locations for the convenience and benefit of the general public. The specific location will depend on the purpose of a specific system or portion thereof. In general, the peripheral stations will be placed at locations remote from the central record holders 10 and 10a, where prospective users most likely wish to provide credit information or transfers to others, that is, where an "authorized use" is desired without possibility of direct personal verification.

A peripheral station, as well be developed more fully below, can be part of the teller's equipment in a regular bank counter; it can be a tool or an aid in a department store at the cashier's desk. A peripheral station can be placed at a gas station, in shopping centers, stores, airports, railway stations, hotels, lobbies of office buildings, etc., and in all these cases an immediate benefit is about to ensue upon the user provided he can furnish immediately, *current* information on his authority to perform an act requiring special authorization, on his credit status, on his credit limits, or even to effect a transfer of funds.

The peripheral stations all operate in accordance with similar principles, as far as communications with at least one control station is concerned. They differ, however, as to the extent and variety of usage, with a basic point being whether a peripheral station is provided for unmanned use by the public without assistance or whether assistance, supervision and cooperation, etc., by personnel is required. It should thus be noted specifically that the stations 20a and 20b do not have to be uniform, but within a general system different types of peripheral stations can be employed; they operate all in accordance with similar general principles and minor adaptations to different specific uses and not of principal nature as far as operation is concerned, but involve primarily the variety of steps and transactions that can be controlled from a unit. As far as the public is concerned, this will manifest itself in differently labeled control buttons which actually perform in principle the same operation in the different units.

In FIG. 1 there is, furthermore, illustrated the principal layout of an individual peripheral station. This station has a receiving and transmission section 21 with which the peripheral station is selectively coupled to the communication system 30 (and through the system 30 to station 10 and/or others). There is a central storage and control portion 25 which receives processes, etc., on a very basic level locally received data and provides for communication with the central station (or stations) through the receiver and transmission section 21.

The peripheral station is provided with an input section for placing data into the storage part of section 25, relevant for the contemplated communication with the central station. In most instances, the input section will includes a keyboard 22 with the aid of which various items of information are being transmitted normally at first to the storage control section 25 for further transmission to the central station 10. Among other possibilities, the keyboard will mostly be used to input a number representing a dollar amount to be referenced against, added to and/or subtracted from an accounting balance stored in the central station. In addition, though not essential in principle, if a keyboard is also provided, there is a card reader 23 for cooperation with cards. As the user inserts one of these cards into the reader he thereby provided particular information stored on the card or cards to the storage and control section 25. This information will mostly be an account number and possibly the security code referred to above. The latter may, however, be inputted also through the keyboard.

Various operations to be performed including storage and transmission, are manually controlled externally through a control button section 24, comprising a number of control buttons for giving the use control over the interpretation of the information he loads, for example, through the keyboard, into the storage section 25 of the station. An indicating section 27 which may be integrated in parts into the control button section, is provided to give simple response and return information to the user in form of "yes" and "no" answers, informing him (and others) as to the success and result of the contemplated transaction or credit check, and most importantly, as to authority of using the account. A more sophisticated station may be provided with a printer 28 which prints out certain information. The basic concept as was stated above is to provide a facility for what can be described as remotely controlled account testing, possibly supplemented by crediting and/or debiting.

Figure 3:
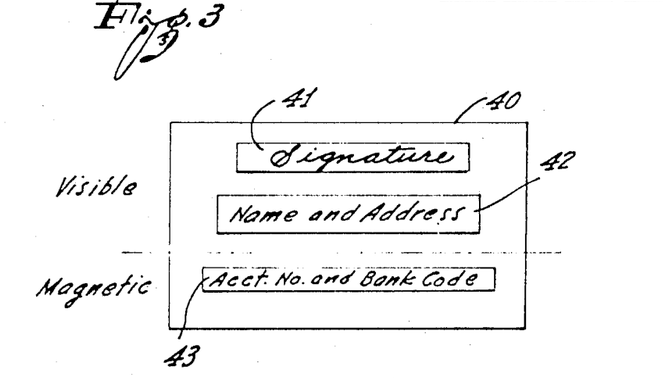
FIG. 3 is a plan view of a credit card used in the system.

The customer may have issued to him a credit card as shown in FIG. 3. In order to provide for withdrawal from the account, or to debit an account, the user or holder of the card or an assistant inserts that card into the card reader portion 23 of the peripheral station. This credit card 40 is similar to conventional cards in design, dimensions and format, having a field 41 for the signature of the authorized user, and having a field 42 for his name and address. The card may also be provided with a field, for example, on the reverse side of the card, showing a photograph of the user and information on usage of the card. The card, in addition, may bear information on the particular type of commercial establishment for which it is intended to be used.

A field 43 may be provided with a magnetic coating or embedded magnetizable strip bearing magnetic imprints or recordings of the account number of the customer. Alternatively, field 43 may have raised bosses for encoding, light contrast producing markers, punched holes or the like, all designating the number of an account the authorized user has with a commercial establishment of the type outlined above and having a central station 10 as described. In addition, that track 43 (it is preferably a single track having the codes recorded in a serial-by-bit format) can be provided with a code that identifies the commercial establishment to which that account number is related. One can think here, for example, of the Federal Reserve number provided for and identifying a bank and/or the telephone number thereof. That code can contain additional information identifying a particular branch office of the bank. In general, this code identifies a specific central station of the system, and will in the following be referred to as central station identification code, or CSID code for short.

One can think of this CSID code as an address-type code. If a peripheral station to the reader of which the card is presented is to operated with one central station only, then the CSID code should be tested as to compatibility. If the peripheral station can communicate with a plurality of different central stations, the CSID code can be used to enable the peripheral station to enter into communication with the specific central station where the holder of the card has the account. The user, in turn, may have different accounts with different establishments, and, therefore, may have different cards.

STORAGE & TIMING IN PERIPHERAL STATIONS

Figure 2:
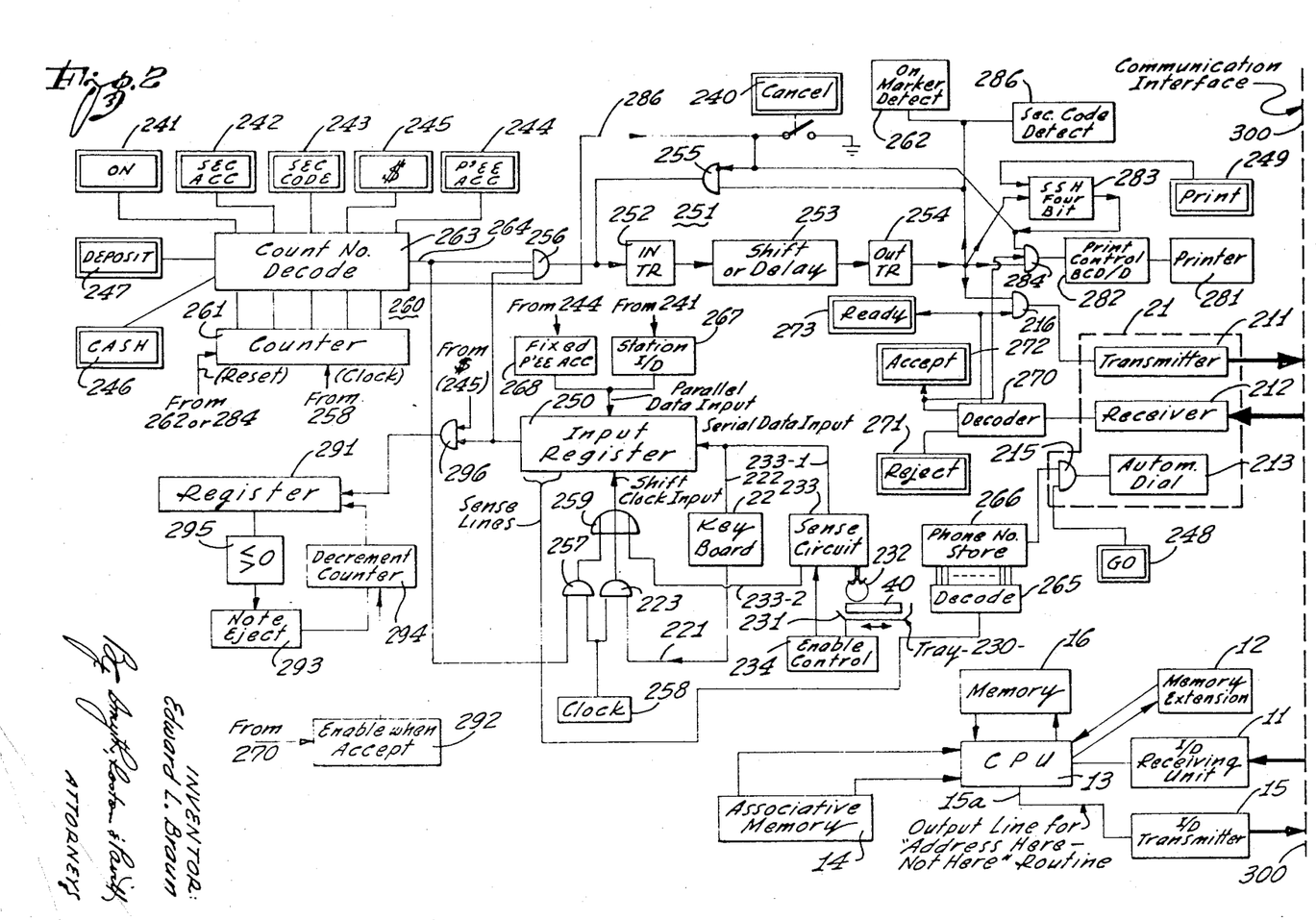
FIG. 2 is a block diagram for one peripheral station showing essential, as well as optional, components and including those portions of a central station essential for explaining the invention.

Having described the general lay out of the system, I proceed now to the description of FIG. 2 showing in block diagram a peripheral station and a portion of the central station as far as is necessary to understand the dialog that takes place between the peripheral station and the central station. In FIG. 2, the principal component of storage section 25 is a circulating storage device 251, employed as such primarily for reasons of economics because a serial recirculating store can be rather inexpensively constructed. This store 251 has an input transducer 252 to which input signals can be applied. The transducer 252 passes the signals to a shifting or delay circuit 253 which may, for example, be a magnetostrictive delay line, with transducer 252 then being an electromechanical transducer for converting electrical pulses into mechanical pulses to be passed into the magnetostrictive delay line. Alternatively, device or element 253 can be a magnetic drum, disc or a looped tape, transducer 252 then being magnetic recording transducer. Still, alternatively, device 253 may be a shifting buffer in form of serially interconnected flip-flops. Input transducer 252 would then be just another flip-flop, unless the several inputs for store 251 are then provided in parallel.

The device 253 is presumed to have a particular length so that pulses applied to its input travel therefrom to its output in a specified time, and the output pulses are then monitored by an output transducer 254 from which they can be withdrawn. For example, if the element 253 is a magnetostrictive delay line, then element 254 is a mechanical-electrical transducer, responding to mechanical vibrations at the output side of element 253 and converting same into electrical pulses. If the device 253 is a magnetic storage carrier, transducer 254 will be a reproduce transducer accordingly; if device 257 is a shifting buffer, transducer 254 will be just another flip-flop.

For normal circulation and normal store operation the output of transducer 254 is coupled to the input of the input transducer 252 in order to close the loop for the recirculating storage circuit 251. A gate 255 is interposed in this loop to impede circulation if inhibitor inputs are applied to is inhibiting input terminal. In the absence of such inhibit signals normal circulation prevails in that the data circulate at a particular period through this store 251. For loading store 251 the output of a register 250 can be coupled through a gate 256 to the input transducer 252. The gate 256 receives gating signals through an output line 264 of a timer circuit 260.

The timer circuit 260 includes a counter 261 and a count number detector 263 to provide enabling signals for predetermined periods of time during which the gate 256 is enabled to couple register 250 to transducer 252. The same enabling pulses as derived through the line 264 are used to enable an output gate 257 of a clock 258 to operate, through an OR circuit 259, as shift clock for register 250. The content of the register 250 is shifted at clock pulse rate, first through the register 250 and through the gate 256 into the circulating store 251 in serial-by-bit format.

The timer circuit 260 includes preferably a counter 261 connected to count clock pulses from source 258. Counter 261 is coupled to the recirculating store 251 for synchronous operation therewith and becomes a circulation counter thereby. A particular marker may circulate in store 251; for example, a single bit. If the store 251 is never filled, and if filling occurs always to essentially gaplessly provide data bits following the marker bit, then there will be a gap in the circulation after the data have all been reinserted into the delay line and before the marker bit reappears. Hence, a detector 262 needs to detect only the first bit after a pause and that instant marks phase zero in the circulation to be used to reset counter 261.

The circuit as suggested here does not require any specific high degree of accuracy nor is ultimately a very high frequency timing necessary for proper operation. Thus, the circulating period of the store is not especially critical. However, the beginning of the circulation of store 251 should be equal to count zero of counter 261 as the beginning of circulation of the timer 260 which can be assured in different ways. If, for example, the circuit 251 is a recirculating magnetic store of the disc, drum or tape loop-type, then the clock for the timer 260 can simply be a separate track providing appropriate timing and synchronization.

In response to input signals applied to the count number decoder 263, it furnishes enabling signals to the output line 264. These enabling signals have a predetermined duration and commence at a predetermined phase (count number) in relation to the periodic zero setting of counter 261. Counter 261 may be a binary counter and in response to input signals of the decoder 263 these enabling signals are provided for the period in between two different count numbers. In other words, the enabling signals mark periods of relative high order count states.

The count state detectors in decoder 263 are enabled respectively in response to input signals developed as the result of pressing one of the seven control buttons 241 to 247 of the control button section 24. For reasons below, the circulating store can be thought of being divided into seven registers, differing merely by the time of presentation of their respective contents in output transducer 254 for recirculation. When the register is empty, no bits are reinserted into the delay line during the respective period. All these periods recur cyclically and have a particular phase (which represents the register identity in relation to the circulation of the "zero" marker). Assuming, for reasons of simplicity, that each register of store 251 can hold the same number of M bits, then count number 0 to N-1 defines the first register; N to 2N-1 the second register, etc. The control buttons 241 to 247, for example, provide signals to decoder 263 to enable detectors therein to provide enabling signals for one of seven different periods, each being N-clock pulses long. During the corresponding periods, bits can be loaded into the respective registers via the input transducer 256, usually from register 250. Inasmuch as the register is clocked from the same clock (258) bits are transferred into store 251 at clock pulse rate during the appropriate periods as determined by manipulation of buttons 241 to 247.

Assuming each register has a capability of $2^6$ (=64) bits, assuming further that the counter 261 is a binary counter with $2^9$ maximum capability, decoder 263 then simply responds to the three high order bits in counter 261, and buttons 241 to 247 respectively select one among the eight possibilities. As long as that bit combination does not change (which is true for 64 clock pulses) an enabling signal is provided in line 264. The control buttons 240 to 249 will be explained in detail when the operation of the circuit is described in the sequence of a normal operation cycle, particularly in conjunction with the operation of loading register 250 and loading data from the register to the recirculating store 251, etc. Also, additional elements employed and illustrated in FIG. 2 will preferably be described in sequence of usage during an operating cycle.

INITIAL OPERATION

When a user, such as the holder of a card, an attendant, or even a third party (such as prospective payor), wants to use a peripheral station, he first presses ON button 241. This operation may, for example, turn the power on for the station placing it into a state of readiness. In case of frequent use of the peripheral station, however, power may be permanently ON. The button 241 activates the detector in decoder 263 responding to the lowest "register number" such as defined, for example, by count numbers 0 to N-1. Also, counter 261 is reset to zero. As counter 261 begins to count, an enabling signal is provided in line 264, until N-1 clock pulses have been counted.

Slightly ahead of response of decoder 263, for example, during the travel of button 241 down to the fully pressed position, a fixed number store 267 is activated to set a code into register 250. In other words, register 250 is forced to assume, in parallel, a particular combination of states of its stages. In general, during this initial phase it is necessary to provide the zero-setting marker into store 251 to cause syncronization of store and counter. Conveniently, this marker may serve also as a code identifying the peripheral station, having one or several one bits in bit positions preceding others as far as subsequent circulation in store 251 is concerned. One can think of this code as the telephone number of the peripheral station (or the teletype call number, etc.), in binary coded decimal notation (no telephone number begins with a zero!)

As soon as the enabling signal is developed in line 264, gates 257 and 259 provide clock pulses from source 258 as serial shift pulses to register 250. Gate 256 is likewise opened so that the bits of the peripheral station identification code (PSID code) are shifted serially into transducer 252 and from there into device 253. After the enabling signal has decayed, the PSID code will circulate in store 251. Its first bit (the code may be presumed to begin with a nonzero digit) serves as count-zero marker and whenever detected by detector 262, counter 261 is reset to zero. The decoder 263 may be provided with a lock so that the particular detector is enabled only once after depressing a button, for example, button 241, rendering the system independent from the duration of depression of the button.

ACCOUNT NUMBER & SECURITY CODE

The pressing of the ON button 241 is, of course, always the first operation to be performed. The following operations need not be performed in the sequence as described. The peripheral station may be provided with a tray 230 on which the user now places a card 40. Depending on the type and location of the station, he has to use the proper card. In general, it will be a card holding an account number identifying an account in relation to which the user wishes to make a transaction. At first only a debit increasing-credit decreasing transaction is considered, for which purpose the account is regarded as a secured account.

The user places the card on a tray 230 and pushes tray and card into a slot of the peripheral station. As soon as the card is being inserted in this manner, a switch 231 of an enabling circuit 234, is activated to enable a card reader having read and sense circuit 233 with transducer 232. As the card passes underneath transducer 232 the magnetically recorded information of field 43 on the card is read. Information output signals of the transducer 232 are suitable amplified by the card sense circuit 233, and the resulting bivalued information bits are passed into signal output line 233-1, which is connected to the serial input stage of register 250.

The coded information may be recorded on the card, for example, in the NRZ1 or in frequency doubling format to obtain at least one signal pulse per bit, for example, one signal pulse for a zero bit, two signal pulses for a one bit, or vice versa. Circuit 232 thus responds also to the mere presence of any bit and a second output line 233-2 provides shift clock pulses, one pulse per data bit, through OR gate 259 to the shift clock input of register 250. Thus, account number and central station identifying number, for example, a bank code, are serially loaded into the register 250 at a rate determined by the pushing of tray 230 with card 40 into the slot.

Having done that the user or an operator presses button 242 which can also be called the "security account" button. When depressed this button identifies for the system the information now held in register 250 as an account number (together with the identification of the central station which, in a sense, can be regarded as an extended portion of the account number), in relation to which a secured transaction is desired. A secured transaction gives information on the status of the account or even decreased the credit balance (in a banking account) or increases the debit balance (in a charge or ready-reserve account). In general, a secured transaction is one requiring particular authorization, and as button 242 is pressed the number now transferred to store 251 is thus identified as an identification number for a limited access-type transaction. The account number so identified pertains to an account protected by security provisions to be described shortly.

As button 242 is depressed a timing signal is provided by circuit 263 to line 264 for opening gates 256 and 257 during a particular phase as far as circulation of store 251 is concerned; for example, the enabling signal may now be discharged during count numbers N to 2N-1 of counter 261. The content of register 250 is passed again in a serial-by-bit format into the recirculating store 251. Due to the timing and phasing operation involved one can say that now the account number and central station identification (CSID) code are loaded into another particular register of the circulating store.

Having pressed the button 242, the user or operator has identified the account number as a secured account for purposes of the desired operation. Thus, further operation involving that account requires that the user places into the input system of the peripheral station a special security code number which is only known to him. The security code should not be stored on the card 40. Preferably it is a number memorized by the user or he may have a reminder slip somewhere on his person as an aid without particularly identifying such a number as a security number having a meaning relation to a specific account on the card 40. This supplimentary code is an essential part of the inventive system. The secured account will be accessed later on for the purpose of the contemplated transaction only when accompanied by the proper security code.

The user will proceed to punch the security number into the keyboard 22. The keyboard 22 will preferably produce the several decimal digits of the security number in BCD format, i.e., for each decimal digit key punched, four bits are made available. The keyboard has a first output channel 221 energized after depression of any of the digit keys of board 22 to provide an enabling signal to a gate 223 for the duration of four clock pulses from the clock 258. The same four clock pulses are applied to the keyboard, so that the four bits per decimal digit are serially shifted into register 250 via the second output line 222 of keyboard 22. Lines 233-1 and 222 may be connected to the same input of register 250 through an OR gate.

There are a variety of possibilities available here for shifting the bits keyed into the system further into the input register, and the one described is just one of them. After having keyed into the system the security number, the user now proceeds to depress the "security code control" button 243. This button, when pressed, causes decoder 263 to provide an enabling signal at a specific duration through line 264 to gates 256 and 257, to cause loading of the security code into what can be described as a third register of the recirculating store 251. If the user has a separate card for the security code, he can place it into the card reader. Keyboard and card reader are equivalent input devices and the several numbers keyed or read into the system obtain their significance through the control button section.

PAYMENT & PAYEE

Next, the amount of money involved in the current transaction has to be keyed into the system. For this, again the keyboard is used normally, and the dollar amount of the transaction is keyed into the register 250. By pressing control button 245 that dollar amount is loaded into a specific position, i.e., into a fourth register of circulating store 251. One can see specifically here that numbers keyed into the system obtain their specific significance through the particular control button.

At this point the basic input operations of the peripheral station in its most simple configuration and application are completed. We may think here of a credit check and/or billing station forming part of the cashier's desk in a merchandising retail branch store, a gasoline station or the like. In these cases, there is no payee other than the one operating the peripheral station. However, for the general case additional information may be needed to effect the transfer and it will become apparent that the special case follows as a simplification of the general case.

If the unit is designed to permit the control of transfer of money between accounts in general, a payee account number has to be loaded into the system. Again the keyboard 22 can be used to set the payee account into register 250, as aforedescribed, and another control button called the "payee account" button 244, when pressed, causes decoder 263 to provide a specific timing signal to load this payee account number into another register of the circulating store 251.

One can think of the peripheral unit as a teller's aid, or an unmanned banking branch, in which the customer wants to make payment from his account to the account of another without writing a check. If the payee is present in person, he may have a card 40 himself. In this case the card reader can be used to place the payee account number into register 250. It is repeated that keyboard and card reader are regarded as equivalent input data sources and the interpretation of the data fed into register 250 is the task of the control buttons such as "payee account" button 244 and the others as aforedescribed. Thus, when the user, or another, inserts a card 40 into the card reader and pressed the "payee account" button 244, this account is then used in a nonsecured transaction, as the credit thereof is contemplated to be increased (or debit decreased).

In an analogous situation the card holder may transfer money from his own checking account to his own savings account or vice versa, whereby, of course, for the specific type of account from which he wishes to withdraw money he has to have a card and particularly the security identification. His security codes will normally differ for his savings account and for his commercial checking account, but he will need only the one associated with the account, the credit balance of which is to reduced. Again, this can be effected in an unmanned environment, and such a station can be provided for that purpose for use by customers.

It is conceivable that the peripheral station is used for purposes of effecting transfer only to a specific account, in which case a keying-in of the payee account number is not need; instead the pressing of the payee account button 244 energizes a fixed data source 268 (provided only for such a specific peripheral station) to force a specific account number in parallel into the register 250, slightly preceding in time the developing of the enabling signal, for loading that specific payee account number into the specific payee account register in recirculating store 251.

One can think of this case as a way in which the customer wishes to make payment in a retail store. The peripheral unit is then presumed to be installed in the retail store. The secured account number together with the security code are associated with a particular bank in which the customer has a checking account. As the clerk in the store presses the payee account number, as provided by the unit in this case, he places the bank account number of the retail store into the register at first and subsequently into store 251. That account number is to be understood also in a general sense as including a bank identification number.

Versatility of this system is readily apparent at this point. If the user presents a "credit card" of the store to the clerk in the store, the identification code associated on the card with the secured account number ensures proper association with the debit account the user has with the department or retail store. There will be no payee account in this case. If, instead, the customer presents a bank credit card, the secured account is his regular checking account. Now the clerk needs to press the payee button to either load a fixed payee account number (namely, a bank account number of the department or retail store) into the circulating store 251, or (if unit 268 is not provided for) that number is keyed into the station.

Still, alternatively one can think of such a station as being installed, for example, at a franchised gasoline dealer. The "-fixed payee" account in this case will then be the account number identifying the account the franchise holder has with the franchisor. The secured account identified by the secured account number together with the security code is then a specific debit account with the franchisor, i.e., the oil company, which thus can be updated immediately in an operation to be described later.

In general, the peripheral station as described thus far permits keying-in of a dollar amount to be transferred from a payor account, associated with a security code, to a payee account. That payee account may be understood, or is set or keyed into the peripheral station. Should the user have made a mistake, for example, in the input keying operation, he will press a cancel button 240 which provides a disabling input for the gate 255 normally closing the circulation path of store 251, whereupon data circulation is impeded, which means that after one period of recirculation all information held in the store is eliminated.

One can readily see that a refinement of the device is possible by tying-in the cancel button mechanically or electrically with the input control buttons 242, 243, etc. If cancel button 240 is pressed, concurrently with one of the buttons 242 to 245, then only the content of that register of store 251 is eliminated. This could be accomplished by AND gating the register identifying enabling signal provided by decoder 263 in line 264 through the cancel-button operated switch into gate 255. The specific enabling signal provided by the timer 260 then serves as recirculation inhibiting input for gate 255 but cancelling only the content of that particular register of store 251.

The button input section as illustrated has two additional control buttons which have to be provided only for a more sophisticated type of peripheral station in a manned environment. There is first a "cash control" button 246. When pressed, a specific timing signal is provided. Button 246 may be coupled to the data input for gate 256 to simulate "one" bits to be loaded into a specific register of the circulating store 251. The mere existence of "ones" in that register serves as an indication that a cash transfer is involved.

It should be noted here that similar storage capabilities of each register in store 251, i.e., similar duration of the timing and enabling signals from decoder 263 was assumed only for reasons of simplicity. The "cash register," of course, could be much smaller, as only absence or presence of loading of a marker is required. Theoretically a single bit suffices. Usage of the "cash" marker is of importance for those banking operations where there is no payee (express or implied), and the central station must be informed (later) that the amount to be withdrawn from the secured account is not to be credited to a different account, but must be entered in the general ledger of the bank and/or the account tracing cash holdings of the bank. Cash is then handed out to the holder of the card by the teller.

The complement to "cash" is "deposit" button 247. Depression of this "deposit" button again produces a timing signal causing marker pulses to be loaded in still another register portion of the circulating store 251, and the existence of markers in that register portion is intended to inform the central station that a deposit has been made to a payee account, no account is to be debited. The utilization of that marker is strictly a matter of programming the computer in the central station. In case a deposit has been made, the account to which that payment is to be credited does not have to be protected by a security code as that account is incremented rather than decremented.

TRANSMISSION

One operation which occurs at the time of placing the security account number into the system, particularly into the register 250, has not yet been described. As was mentioned above, the bank code or identifying code for the central station may, in the general case, be part of the code of the secured account number which is read from the card and held in register 250 prior to pressing button 242 for loading that specific account number into the appropriate register in store 251. Actually, this central station identifying number (CSID code) does not have to be transferred into store 251, but it may simply be inconvenient to separate that code from the bank account number proper. The main purpose of the CSID code is the following.

A decoder 265 will respond to the content of that portion of register 250 which holds the central station identifying number (CSID code) and will permanently energize a specific location of a "phone number" store 266. As was mentioned above, the mode of communication between the peripheral stations and the central station is an optional feature, but for purposes of explaining the communication it is presumed that the usual telephone lines are being used. If the store 266 does not have the phone number associated with the CSID code, decoder 265 produces a reject signal for energizing reject indicator 271. This may also initiate an automatic cancel operation, i.e., the reject signal may serve as an alternative input for the inhibition gate 255. A reject signal at that phase indicates that the specific peripheral station cannot communicate with the central station called for by the CSID code on card 40. Store 266 may hold only a single telephone number or many, depending on the degree of versatility endowed upon the specific peripheral station. The store 266 may consist of a number of cards with notches or the like to serve as an automatic dialing control element. The card with the number selected by the decoder will be placed into a state of preparedness.

The system could be constructed that the CSID code is the telephone number of the central station. In this case decoder 265 can be omitted and store 266 is a normally empty static register receiving the CSID code, i.e., that telephone number and the dialing device 213 proceeds with that number as was read from the card. Any peripheral station can communicate with any central station, whenever a card has for identification of its central station the telephone number of the latter.

Having keyed into the peripheral station the various items of information, or some of them, as described, a compound word has been assembled in store 251, and the user will press the "go" button 248 to effect a transfer of that compound word to the central station. This button does not operate on the timer 260, instead, a gate 215 causes the required phone number to be fed to an automatic dialing device 213, pertaining to the section 21 of the peripheral station and provided for coupling the peripheral station to communication facility 30.

Automatic dial circuit 213 is connected to the telephone line and will send dialing pulses into the telephone communication system in the usual fashion. It will usually do so repeatedly if receiving a "busy" signal, until not receiving a busy signal (or until the user presses the cancel button). The telephone system outside of section 21 of the peripheral station is generally denoted as communications interface 300. The phone system of the central station 10, when not busy, will issue a ready signal, which may be a tone of a first specific frequency or pulse code received by receiver 212 of the peripheral station and responded to by a decoder 270 in the response section of the peripheral station, providing specifically a ready signal in a ready indicator 273.

The ready signal served also as an enabling signal for a gate 216, coupling the output transducer 254 to the telephone transmitter 211, so that the content of store 251 is store to the central station. Decoder 270 is preferably coupled to decoder 262 and/or controlled by the timer 260 to begin transmission at zero count of the counter 261 and to terminate transmission after one complete cycle, so that the information is being transferred to the central station in the specific order of circulation in store 251. The order of circulation of data in store 251 was determined by the phase of the respective timing signals from the decoder 263 during the loading process. THerefore, the compound word defines the significance of the several items of information as presented to the central station by the order of transmission. The sequence of appearance of the several numbers corresponds to respective location in "registers."

Whether or not all the output signals of transducer 254 can be applied to the transmitter 211 during one cycle of the store 251 depends on the clock pulse rate, i.e., the bit frequency and the passband characteristics of the communications facility 300. Assuming a clock pulse rate of $10^5$ or $10^6$ c.p.s. and a total storage capacity of about $2^9$ bits, then circulating frequency of the store 251 is about $10^3$ c.p.s. in which case the transfer between store 251 and central station must be carried out at a rate of one bit per cycle of the store, in order to remain within the passband of the telephone system. The process is to be controlled by the counter 261. If a rotating disc or drum or tape loop is used, then the clock pulse rate can be drastically lowered to be itself within the passband of the communication system. Assuming a transfer rate of bits in the kilocycle range, then the transfer of $2^9$ bits takes less than 1 second. With this we turn to the central station and to be described as far as necessary.

CENTRAL STATION PROCESSING AND RESPONSE

The central station 10 has an input-output receiving unit 11 which couples the central computer or computing system of the central station to the telephone line, interface 300. Unit 11 "sees" all incoming calls, provides the ready signal frequency, receives the data train, and stores the information, preferably in a memory extension multiplexing 12, such as disc drum or the like. In view of the conceivably low bit transfer rate, the computer may receive several, even many requests, simultaneously through buffer and multiplexing operations. The computer will take up the several requests impliedly included in the transmission of the information, whenever its time sharing capabilities will permit. Since the station identification code transmitted as first data block includes or may include the telephone number of the peripheral station, the computer may thus recognize long distance calls, and give them priority. Alternatively, the computer may terminate the call upon receiving the entire data train, to call back after having processed the received information. However, in view of the speed of modern computers, the computer can be considered ready to take up the request after a delay which, in relation to normal, real time operations, such as pushing buttons, telephone dialing, etc., can be regarded as instantly. As stated, the transmission of the compound word takes about 1 second. The processing speed of the computer is comparable therewith. One can thus expect only a few seconds total communications time, and special rates can be expected for such short telephone calls.

The central processing unit 13 (CPU) of the computer will, first of all, respond to the content of those "registers" as now reflected in whatever storage facility is used by the computer, holding the security code number and the secured account number. The content of the security code number is, for example, interpreted by CPU 13 as an address for an associative memory 14. The location in member 14 addressable by the security code holds the security account number properly associated with that particular security code number. The associative memory will, therefore, furnish the security account number held in the presently addressed security code number address location and pass that number to the CPU.

It should be mentioned that the security code need not be unique to the authorized user of the account, as only the association between security code and account number has to be unique, and, of course, the account number itself is uniquely related to a particular customer of that bank or store. Thus, in this case the number of the secured account will be an address and the proper security code is the content of the memory location having that address. From a system standpoint, both cases are equivalent, as they both produce in the computer the two numbers as associated. The program is designed to first make a comparison between the security account number (or security code) furnished by the peripheral station with the number held in the addressed location of the associative memory 14. Comparison instructions as part of the computer program usually involve merely a subtraction coupled with a test of whether or not the result is zero. The numbers do not compare if the result of the subtraction is not zero.

As is generally known, computers operate in a manner that in response to results of such number comparison tests, the program branches to one or the other of two different routines. If we assume that the security account numbers or security code numbers differ, then the situation is such that the user did not provide the correct security code. Either he made a mistake or the card apparently was not presented by its authorized user. In either case, the security code dialed or keyed into the peripheral station is in the central station not associated with the specific secured account number which was presented to the peripheral station concurrently. In this case, the computer in the central station will branch to a routine in which a particular input-output line, such as 15a, passes a "not compare" signal to the input-output transmitter portion 15 of the computer which is part of its immediate peripheral equipment, resulting, for example, in the production of a second specific frequency signal.

This second frequency is transferred to the still open telephone line and received by the receiver 212 in the peripheral station. The second frequency signal is decoded by the decoder 270 as a reject response on part of the central station, triggering the reject indicator 271. It should be noted, however, that a transmission error could have occurred. Therefore, input-output device 15 of the computer may issue the first frequency signal again when detecting the "not compare" situation. The first frequency, when decoded by the decoder 270, causes again activation of gate 216 and another transmission is effected. Only when the "not compare" situation occurs the second time, the second frequency signal issues to signal rejection.

Concurrently that same signal may be used as an inhibiting control signal for the gate 255 to erase the contents in register 251 and to disconnect the telephone unit in the peripheral station from the communication interface. The branching by the computer to the reject routine will lead to a dumping of all information received previously from that specific peripheral station. It is optional whether the computer will record the attempt made as to an unauthorized access to the secured account. More than two or a few successive attempts to gain access to a secured account without proper security code should be recorded, and if received from an unattended station, a special alarm may be provided to prevent systematic attempts to gain access to the account by trial and error.

Of course, it may well be that the authorized user keyed-in the wrong security code number. The reject signal indication then simply informs him of this fact and it can simply be regarded as an invitation to try again, to put into the system the proper security code number. Otherwise it is quite clear that an unauthorized use of the card was attempted and appropriate steps can be taken particularly if the peripheral station is used in a manned environment.

The other situation is, of course, that the secured account number and the security code keyed into the peripheral station and transferred to the central station have a counterpart or duplicate in the associative memory. In this case the computer branches to a different routine. The associative memory 14 (but a different portion) may again be employed, the address being the secured account number found to compare as was described. The content of that address location is a number equivalent to the balance of that account. That content is withdrawn, if the account is a normal checking, banking, savings account or the like, then the dollar amount number which was keyed into the peripheral station and transmitted and which is likewise part of the data currently processed by the computer is, for example, subtracted from the balance of the account. The difference is tested to determine whether it is positive or negative If it is negative, another reject situation is present and the computer branches to another routine, again energizing output channel 15a causing input-output transmitter 15 to provide the reject frequency signal. However, the program could be written that the first frequency signal issues first to cause repetition of transmission of the data from the peripheral station. Only after an attempted "overdraw" is detected the second time, rejection occurs.

Another routine may be interposed here before the reject signal issues. If the result of subtracting the keyed-in or dialed-in dollar amount from the current credit balance is negative, the computer may branch to a routine testing, whether the user has what is sometimes called a ready-reserve or customer credit account. If he has, the debit balance of that account is incremented, and the routine then tests whether the credit limit of that account would be exceeded; if so, the reject signal issues.

It is conceivable that for the two different reject situations, (1) account numbers do not compare, and (2) insufficient funds, two different reject signals are provided in form of different frequencies. Analogously, the peripheral station may have two reject indicators distinguishing the two different reject situations.

Should the difference between current balance and amount sought to be debited be a positive one, then the routine continues in storing the diminished credit balance (or the increased debit balance) into the location defined by the secured account number and thereafter output line 15a of the computer causes the input-output transmitter 15 to provide another frequency signal as an accept signal. As the accept frequency signal is received by the receiver 212 of the peripheral station, it is decoded as an accept signal, causing the accept lamp 272 to light up. The user is now informed that the transfer has been successfully completed.

It may still be required in the computer to add the dollar amount subtracted from the previous balance of the secured account to the credit balance of the payee account. For the general case a payee account number is part of the information initially transmitted by the peripheral station to the central station. The program may be written such that the accept signal is transferred to the peripheral station only after the payee account has been credited with the dollar amount in question. Of course, the computer has to update the information tracking the bank's credits and debits. This, however, can be done without requiring association of funds with specific accounts. Thus, strict security and secrecy of the individual account holder can be observed.

It is conceivable that the payee account is not in that particular bank, in which case account number, destination bank identification and dollar amount to be credited to that account is recorded. Alternatively, for example, by interbank cross traffic, as was symbolically illustrated in FIG. 1 with line 17, the other bank is called upon for a transfer to the account of the payee together with updating information for the accounts banks have with each other. That other bank is affected here only as to crediting one of its customer accounts; information on this account, or debiting thereof, is not involved. This interbank transfer operation may instead run through a central clearing house. The payor's account number may be recorded in association with the effected transfer to identify the payor to the payee.

As far as the operation of the central station in a bank is concerned, we have not yet considered the possible existence of special markers designating cash or deposit transactions. It will be recalled that the markers may be part of the compound word transmitted by the peripheral station to the central station. The programmed computer processing this compound word, therefore, will include instructions to the effect of testing the existence of these markers and in case the "cash" marker is there, the dollar amount subtracted from the secured account is not to be deposited in any other customer account but has to be subtracted from the bank account which defines the bank's cash holdings which, of course, is strictly a matter of internal organization and "bookkeeping" by means of the computer, as far as the bank's assets is concerned. The "deposit" marker, if present, will cause the computer to branch to a different arithmetic routine, simply causing the dollar amount to be added to the payee account with concurrent incrementing of the account defining the bank's cash holdings. A security check is not needed in this case because there is no customer account from which money has been withdrawn.

If the central station which was addressed by the peripheral station is designed for central bookkeeping and credit accounting, for example, in a department store or for a merchandising outfit with retail branch offices, the operation is, of course, simplified in that each transaction is debited to the customer's secured account which is a debit account, there being no special payee account involved because the outfit running this system, per se, is the party who extends credit and to whom subsequent payments have to be made. However, the peripheral station identification code can be used for internal bookkeeping purposes. In addition, a credit limit check is performed in that the incremented debit balance is compared by the computer with the limit value and the computer furnishes the accept signal only if that limit is not exceeded.

As was already mentioned, the particular peripheral station in a department store may permit optional-type operation in that for purposes of debiting the customer's debit account with the merchandising outfit (using the store's credit card), the peripheral station communicates with the central station as owned and operated by the merchandising output itself. If the customer has not such a card, he presents a bank-type credit card to the cashier, and then the peripheral unit, via the telephone line establishes the connection to the bank where the customer has his checking account. The payee control button of the peripheral unit is needed here to establish the fact that payment is made for the credit of the merchandising outfit. This payee may have either an account with same bank, or a credit transfer is made, as outlined above, by suitable cross communication between the customer's bank and the house bank of the merchandising outfit.

Normally one can expect only a very short delay between the transfer of information to the central station and the processing thereof with subsequent issuance of the response information. That delay may be at most in the order of magnitude of seconds. If however, the number of accounts handled and the number of peripheral stations connected to the system and, therefore, the number of concurrently made request becomes increasingly large, it may be inadvisable and impractical to hold the communication lines open until the central station provides the answer. Particularly, if the call is a long distance call. Therefore, after transmission of the data from the peripheral station to the central station the telephone connection may be broken and after the central station is ready to provide the response it uses the PSID code number to operate its dialing mechanism and to call on the peripheral station for enabling the receiver 212 for reception of an accept or reject signal then transmitted by the central station.

It can thus be seen that upon communicating the keyed-in information to the central station, the latter processes the information and an accept signal is received subsequently by the peripheral if 1) the secured account, the credit (debit) balance of which is to be decremented (incremented), was properly associated with the correct security code and (2) if there were sufficient funds (or a credit limit not exceeded). Otherwise, a reject signal is received. In both cases, the store 251 in the peripheral station may be emptied; however, in case of an accept situation, addition steps may be controlled by the peripheral station if so equipped, and as will be described next.

SPECIAL OUTPUT DEVICES

In the previous chapter the return information as provided by the central station simply signaled an acceptance or a rejection for any of the reasons as discussed. For most cases this fully suffices. However, in some cases the user may want quick information on the balance of his account. Thus, some peripheral stations may be equipped to receive data from the central station to render this service. The computer recognizes a peripheral station having this capability by its PSID code, and will, for example, provide fourth-frequency pulses representing the current (updated) balance of the account of the user. These pulses may be recognized by the decoder 270 and are fed as serial input to register 250. A display device 275 is coupled to the register to display its content. This display device may always be operational, or can be made operational by a control button, to permit the customer to check immediately the data he inputs. Presently, that display is used to display return information such as the balance of the account. One can readily see that a customer can check on his account without effecting a transaction, by keying-in a dollar amount 0.0, so that the response information is the current balance. This will be significant for the system if the customer has forgotten his current balance and wants to avoid the embarrassment of an "insufficient funds" or "credit limit exceeded" rejection before offering payment in the manner provided for by the system.

The peripheral station as described thus far can be supplemented in a manner which does not effect its communication with the central station, but involves further utilization of the accept signal if received. For example, it may be desirable to obtain a printed record as far as the completed transaction is concerned. In other words, a printing process may be instituted in response to an "accept" signal received by the peripheral station from the central station. This may, for example, be necessary in order to provide the customer of a retail merchandising branch or of a manned or unmanned banking establishment, with a printed receipt. Also, a printed record for all successful transactions may be desired for the local branch.

One of the supplementary devices is a printer 281 for cooperation with a suitable material and operating in response to the accept signal from the decoder 270. A printer control unit 282 is energized or enabled by the accept signal. For example, a data input gate 284 is enabled by the "accept" signal. Control unit 282 is primarily a binary code decimal-decimal converter for receiving the content of the circulating register 251 in code blocks of four bits, to cause printer 281 to print decimal digits. It will be recalled that all numbers are presumed to be stored in BCD format in store 251.

The BCD deconverter 282 is coupled to the output transducer 254 through the AND gate 284 in synchronism with the zero setting of the counter 261. A 4-bit counter 283 receives clock pulses from clock 258 subsequent to the appearance of a data bit in enable 254, to cause gate 284 to transmit four bits to printer control 282. The same enabling signal provided by counter 283 and covering four bit periods is fed as inhibition input to gate 255 to keep these from further recirculating in the register. After the 4-bit counter 283 has covered four bit periods, it disables itself and the printer control 282 is temporarily decoupled from the store 251. It is apparent that printing can commence only when 44-bit counter or detector 283 is operational. Hence, print control button 249 can be used to enable counter-detector 283. The print control button 249 may actually also be one of the control buttons through which store 251 is loaded. For example, if the central station has provided the current (updated) credit or debit balance of the account of the user to register 250, pressing of the print button 249 may cause first loading of the content of register 250 into another register of store 251, to be printed out subsequently. In this case a display 275 would not be needed.

For reasons of simplicity it is assumed that it takes one circulating period of store 251 to cause printing of one digit. It should be noted, however, that for a clock pulse rate up to or in the megacycle range, the circulating frequency of store 251 is in the kilocycle range. It is thus advisable to provide for a dialog between printer control 282, counter 261 and 4-bit counter 283 as controlling gate 284. The 4-bit counter can be energized anew from any bit only after the four bits previously withdrawn have been printed as a digit. That may require several cycles of the store. Device 283 is preliminarily enabled by printer control 282 each time a digit has been printed. For proper timing detector-counter 283 is enabled subsequently through counter 261 before or at recycling of counter 261 through zero, to provide another gating signal for four bits to gate 284.

As the "zero" marker circulating in the store 251 may have been eliminated (during the first printer cycle), counter 261 recycles asynchronously or is reset by any first bit reappearing at transducer 254 and in detector 262 after a pause. As that bit may pertain already to a character to be printed, it is preferred to detect a high order number in counter 261 when reached and before the counter resets to zero, but reached with certainty during a data pause (as store 251 is never completely filled). Detection of that high order number can be used to enable detector 283 after the printer control 282 has signaled completion of print of the last character.

Inasmuch as the printed bits are not recirculated, the system causes always the respective first four bits after each circulation period of store 251 (+four bit periods) to be printed *and* erased. The store 251 will thus be emptied in steps with digit after digit being printed out. Groups of four bits not constituting a BCD value may be interpreted as other symbols or just as blanks. However, it has to be observed that under no circumstances should the security code be printed out. One way of preventing this is to provide a manual control button "print" 249 for enabling printer control 282 after the accept signal has preliminarily enabled the control. That print control button 249 additionally energizes another count number detector in decoder 263 responding to the same number period as the detector enabled by security code button 243. The detector enabled by print button 249 provides, through line 286, the corresponding timing signal to gate 255 to eliminate from the store the circulating security code. Printing is deferred until that circulating period during which the security code is deleted has been completed.

Alternatively that specific timing signal may already be developed by decoder 263 in line 286 in response to the "go" button 248, so that during the same cycle when the compound word stored in store 251 is transmitted therefrom to the central station, the security code is already erased from the respective register in store 251. Still alternatively the security code, after having been keyed into the register 250, and prior to being transferred to the register 251 by pressing of button 243, may simply be augmented in the register 250 to be preceded by a special code block, for example, a specific 4-bit character which is outside of the format needed to express the decimal digits 1 through 0 and which, therefore, represent a nonlegal character as far as decimal number representation is concerned. That character denotes the register portion in store 251 specifically holding the security code.

During the printing and stepwise emptying process a security code mark detector 286 detects the marker preceding the security code. The detector is completed after the marker code is in the printer control 282, just causing printing of a blank. The marker code is already erased from store 251 at that point. It will be appreciated that at that time the specific period marking the loading and recirculation phase of the content of the security code register in store 251 is in progress, but the corresponding detector in decoder 263 is not enabled. The detector 284 may simply enable that detector in decoder 263 (or a duplicate one) and cause its signal to be used as inhibiting signal in recirculating control gate 255. During the next store cycle the entire security code register is empty, and the next four bits to be printed out pertain to the next register.

The form of printing is adaptable to the circumstances and to the environment, purpose, etc., of the peripheral station. As stated, sales slips can be printed or there is a deposit-type slip or any other paper record to be prepared initially by the customer or an attendant, which is inserted into the printer so that the content of the store 251 holding the relevant data of the transaction is being printed.

Normally, the printed information will include the secured account number, the dollar amount of the transaction, identification of the transaction (deposit or cash); the payee account number, if there is a payee. If the peripheral station is provided to receive the new balance of the account and if, as was mentioned above, that new balance has been stored in store 251, that new balance will likewise be printed. In addition, the peripheral station may be provided with a date and time clock and the position thereof will also be printed.

The peripheral station constructed in this manner can be used in an unmanned environment for the immediate control of dispensing operations in response to an accept signal when returned by the computer. It may not necessarily be economical to employ the system for providing payment for very inexpensive goods such as a beverage dispensed by machine or the like, but the system can well be used as a means for the control of dispensing meals or more expensive type merchandise, insurance policies in airports, or the like. The accept signal returned to the peripheral is then used, for example, as an unlocking control to permit merchandise to be withdrawn. A dollar amount may not have to be keyed into the system at all, if the access request implies a transfer of a specific valve. A peripheral station would then not need a keyboard nor a dollar amount control button or key. The two different codes may also serve just as access codes, possibly identifying specifically the person who has sought access to a restricted area and the time of entry is then recorded.

One of the possibilities which can be regarded as a special type of merchandise is the dispensing of notes which can be regarded as the equivalent of traveler checks. In this case additional equipment is required to be included in the peripheral station. A particular register or small circulating delay line 291 is provided to receive the content of the input register 250 for storage in response to the depression of the "dollar" button 245, i.e., concurrently with the loading of that number into store 251.

As the central station has signaled acceptance of the transaction in response to such signal, and enabling circuit 292 activates a decrement control 294 to reduce the content of register 291 by a number equivalent to the denomination of the notes to be dispensed individually; the notes have to have similar denominations. The content of the register 291 is then tested at 295 whether it is still larger than zero. If this is so, a note withdrawal mechanism 293 is then triggered to dispense a note. The withdrawal mechanism 293 may be constructed basically similar to machines permitting automatic dispensing of stamps. As the withdrawal control mechanism 293 has dispensed a first note, it triggers the decrementing control circuit 294 which by way of subtraction decrements again the number held in register 291. The decrementing number is tested again and if > 0 the mechanism 293 is activated again, etc.

One can see that a counting operation is performed by the loop as described, causing the withdrawals to occur until the sequentially decremented content of the register 291 is not a positive number any more. Of course, it is advisable in this case that the dollar amount keyed into the peripheral station is an integral multiple of the denomination of the notes as the dispenser will cause dispensing only of as many notes as the next lower multiple of the denomination value in relation to the keyed-in dollar amount.

The station should be constructed to prevent a loss to the customer if there remains a remainder. This could occur when the number keyed-in is not an integral multiple of the denomination, or if the station runs out of notes. In this case the register 291 (holding the remainder) should be connectable to gate 256 in that simply by pressing dollar button 245 this remainder is loaded into the store in lieu of a keyed-in amount. The user then keys his account number again into the station (or uses his card) but presses the payee button, then the "go" button and the amount in question is returned to his account.

The dispensing circuit, as described, can be coupled for cyclic operation to the printer whereby each bank note, before it can be withdrawn, receives the account number of the secured account as printed identifying information. The station identification code may also be printed on each note for further identification. In this case the above-described printing operation has to be modified in that each printing operation will cause erasure of the remaining content of the register 251 only after the last printing cycle for printing the account information on the last note to be dispensed.

Prior to printing, not only the security code but also the total dollar amount is canceled from store 251 through timing of the inhibiting control of gate 255 as aforedescribed, because the total dollar amount is irrelevant for each individual note. Since there is no payee account in this case, the printer can print the entire remaining content of store 251 on each note. The remaining content will be the secured account number of the drawer or purchaser and the PSID code, identifying, so to speak, the specific source which issued the notes.

It should be noted that the following simplifications are conceivable which, and this is the important point, do not require alteration of the system as a whole. For example, the peripheral station does not have to be provided with a card reader which is an important cost reducing factor. This will be of significance, particularly in an unwanted environment where the credit card itself does not serve as additional identification of the user. The user then still has his card but reads the account number and bank or store identification number from the card and keys them into the register. It is thus, an optional feature, and does not effect at all the basic operation of the system, and particularly does not preclude utilization of the card in a different peripheral station connected to the same system and having a card reader.

A supplement of the system is a second card for each account card which the user has to keep in a separate place, preferably not in the same wallet in which he keeps his account card. This second card can be called his security card as it holds the security code in machine readable form. Employment of the second card is advisable only in case the user feels that he cannot memorize the security code. The user then simply inserts that second card also into the card reader and upon pressing the security code button 243, the number is loaded as security code in the appropriate address register of store 251.

It follows from the foregoing that keyboard and card reader are to be regarded as equivalent input devices, to be employed both in a single station only for reasons of facilitating system usage. If a user has forgotten his card, but knows the numbers involved, he can still effect a transfer. This is most important for the system, as knowledge of the proper combination of numbers is the sole requirement for effecting a credit reducing or debit increasing transfer, possession of the card is not.

MODIFICATION

The credit card 40 was described as having among other information a code, such as a central station identification code to associate the card and its user with a particular central facility (bank, oil company, department store, etc.). It is, however, possible to have different CSID codes on the same card. If the customer has the same account number with the several facilities, the different CSID codes could be recorded generally on the same track. The social security number may well serve as a general account number of a customer. The peripheral stations operated within a system of one central station (oil company, department store) will always communicate with its associated central station. The decoder 265 of such a peripheral station simply determines whether the particular CSID code needed is among those on the card.

The card may have a plurality of tracks for reasons of space, particularly when the account numbers with the different establishments differ. The tray 40 may then be constructed to be laterally adjustable to permit placement of the card in particular relation to the read transducer 232 so that the proper track is reproduced. Several tracks will take care of the situation where a peripheral station can communicate with different central stations, such as in case of a department store, where debiting of the customer's account with the store, or debiting of the customer's account in his bank is offered as alternative possibilities. The same card may thus have a "department store track" and a "bank track" and adjustment of the relative position between card and reading transducer operates as selection of the type of transaction desired.

The card is dispensable, as all relevant numbers can be keyed into the system. The keyboard, however, is indispensable if the dollar amount involved in the transfer is a variable one, as is usually the case. However, special peripheral stations are conceivable, used in cooperation for payments of fixed amounts. For example, if the station controls the dispensing of items of merchandise, all costing $1.00, then the keyboard is not needed, provided the security code is also on a card in machine readable form. The dollar button 245, when being depressed, simply causes that fixed number to be set into register 250, using a fixed number store such as was explained above with reference to elements 267 or 268.

The notes dispensed automatically as described (or available otherwise) may have denomination and serial number recorded in machine readable language, such as magnetic ink or the like. They can thus be placed into the reader 23. A holder of the note may offer it in lieu of cash and in lieu of credit or bank card-type payment as described, particularly if this local bank is in another town. A peripheral station equipped for accepting such notes has its tray 230 provided with a lock which locks when the tray has been pushed in. An unlock device is operated (1) after button 245 has been pressed, (2) after, in response to loading the dollar amount register portion of the store 251, and (3) after the note has been invalidated (and perforated, etc.) and dropped into a locked hopper, etc.

The serial number of the note, when read therefrom, can be placed in a separate register portion (not yet used) of store 251, which can be regarded as an extension of the dollar amount register portion thereof. The computer program in the central station will then test the serial number against those which are identified as stolen and kept in a master file of the computer memory. In lieu of those provisions, a separate control button (not shown) equivalent to the buttons 241, 242, etc., can be provided for manually controlling the loading into that register extension of store 251. This permits keying-in of the serial number; if not on the note in machine readable form.

Other modifications are conceivable which involve construction of a peripheral station and its operation and should be mentioned as possible equivalents. The various items of information are identified within the compound word circulating in the store 251 by their order of circulation. The order of circulation is established through appropriate timing of the transfer process which in turn was controlled through the buttons 242, 243, etc. Alternatively, and this has already been mentioned for a special case (security code), the depressing of any of the control buttons may cause specific markers or identification codes to be set into appropriate stages of the register 250 to precede and/or succeed an associated item of information to thereby identify that information as secured account number, payee account, dollar amount, PSID code, etc. In this case the order of circulation in the store 251 is immaterial and the various control buttons 242, 243, etc., do not provide for different but predetermined phases in relation to circulation of store 251 for loading the store 251 from register 250. Instead, the phase of positioning and coupling is progressively incremented as each button is depressed, regardless of the sequence so that the order of circulation is equal to the sequence of inputting, which, in turn, is again arbitrary.

If the user is instructed to observe a specific sequence of loading, special markers are not needed but it is still possible to cause buttons to provide progressing "time stots." In case of random loading the computer program in the central station must be written in such a manner that the respective identification codes attached to each item of information within the compound word is first scanned, interrogated and used to interpret the respectively associated item of information. If the store 251 has static elements for storage counter 261 is superfluous. Instead, the control buttons 241, etc., cooperate with a decoder (analogous to decoder 263) to enable different sets of parallel or serial input gates to provide the appropriate transfer from master input register 250 to the several registers of store 251. During transmission (under operation of go button 248) the clock pulse source 258 is then coupled to the store 251 (when constructed from static elements) to serially clock the data out of the store with concurrent recirculation. During printing, serial clocking can be produced through the control 282, whenever ready to accept a new character (four bits).

It should be mentioned that the system takes care inherently of several legal requirements in the area of banking in general. Access as to information on the status of an account or even the control of withdrawal from an account are possible only for the legal holder of the card, who, by law, is entitled to such access and such information. The access operation itself is possible only in cooperation with the security code known solely to the owner of the account or persons authorized for access to his account by him. Moreover, access to files is restricted to the bank or establishment which we may regard as the issuer of a specific card as identified on the card by the banking code number. On the other hand, automatic transfer for the benefit of the account of another is not restricted and it is, therefore, possible by placing a payee's account number into the system which may be at a different bank. The system does not provide for access to the account of the other, but merely permits the recording equipment of the bank or establishment which is the issuer of the security account number and card of the holder to provide credit transfer to the payee bank which then is being made between the two banks involved in a manner most suitable to them without requiring access to the payee's bank by the payor and/or his bank.

The invention is not limited to the embodiments described above but all changes and modifications thereof, not constituting departures from the spirit and scope of the invention, are intended to be covered by the following claims.

What I claim is:

1. A communication system for a plurality of peripheral stations and a central station particularly for the remote control of financial transactions and selective linking to each peripheral station of the plurality, the improvement comprising:

first means in each of the peripheral stations for receiving and accepting independently manifestations of first and second multidigit numbers, the first number defining an account handled by the central station, the second number representing a security code, the first means including keying means providing manifestations of distinguishing significance for the first and second numbers, for particularly identifying a received second number as security code;

second means in each of the peripheral stations including keying means for providing manifestations of a third number having monetary significance;

means in each peripheral station for storing the manifestations of the first, second and third numbers;

third means in each of the peripheral stations connected to be responsive to the stored manifestations of the first, second and third numbers for transmitting first signals representative thereof to said central station;

fourth means in said central station including data processing and memory means connected to be responsive to the transmitted signals and to absence or presence of a duplicate of the particular association of said first multidigit number and of said second multidigit number in the memory means, the fourth means providing second signals representative of absence of said duplicate of number association, in case of presence of said duplicate of number association processing the signals representing the third number as transmitted and providing third signals as response information representative of successfully processing the third number;

fifth means connected for transmitting the second and third signals to the peripheral station which transmitted said signals; and sixth means in each of said peripheral stations responsive to the transmitted second and third signals as response information when having transmitted the first signals, and providing distinguishing indication representative respectively of the second and third signals.

2. A system as set forth in claim 1 including means in at least some of the peripheral stations for accepting manifestations of a fourth number representing a second account between which and the account defined by the first number a transfer is to be effected, the third means transmitting signals representative of the fourth number, the fourth means including means for arithmetically relating the first number, the third number and the fourth number to each other for effecting said transfer as part of said processing.

3. A system as set forth in claim 1 including means in at least some of the peripheral stations for accepting manifestations defining a cash transfer at the peripheral station.

4. A system as set forth in claim 1, the first means in at least some of the stations including a card reader for reading manifestations of the first number stored on a card.

5. A system as set forth in claim 1, there being a plurality of individually addressable central stations, the first means in a peripheral station including means for recognizing a portion of the first number as address code for a specific one of the central stations of the plurality, the third means including means for establishing a communication link to the specific central station as identified by said address code.

6. A system as set forth in claim 1 and including means in at least some of the peripheral stations for effecting a printout of information as received by the first and second means including the first and third numbers to the exclusion of the second number.

7. A system as set forth in claim 1, the first means including reading means for cooperating with cards holding manifestations of the first and second numbers, the first and second numbers being stored on different cards.

8. A system as set forth in claim 1, the fourth means including means storing signals representing a credit or debit balance in association with stored signals representing the first number, separated from the storage of said duplicate of number association as stored in the memory means.

9. A communication system for a plurality of peripheral stations and at least one central station for remote control of financial transactions and for selective linking to each peripheral station of the plurality, the improvement comprising:

input means in each of the peripheral stations for independently receiving manifestations of a first one of a plurality of secured account numbers, a second one of a plurality security code numbers and a third number of monetary significance and including externally accessible means for providing manifestations distinctly characterizing the second number as security code number;

first means in each peripheral station connected to store the manifestations of the first, second and third number, including manifestations distinctly characterizing these numbers;

second means in each of the peripheral stations connected to be responsive to the stored manifestations of the first, second and third numbers for transmitting signals representative thereof to the central station;

third means including memory means in the central station for being responsive to said signals and including (a) means for testing the association of the first and second number as transmitted in relation to manifestations in memory of associations of individual ones of secured account numbers of the plurality and security code numbers of the plurality, (b) means for transmitting to the peripheral station a reject indicating signal in case of absence of manifestation in the memory means of the association of the first and second number as transmitted, (c) means operating in case of presence of said manifestation of association for processing the third number in relation to credit information held in memory in association with the account defined by the first number, (d) means for transmitting indicating signals to the peripheral station which at least impliedly include representation of presence of said manifestation of association; and means in each peripheral station responsive to said indication signals for providing an indication representative thereof.

10. A system as set forth in claim 9, the first means including a card reader for reading at least one of said numbers from encodings on a card when represented to the reader.

11. A communications system as set forth in claim 9, at least some of the peripheral stations including means externally operable for establishing a communication link between the peripheral station and said central station.

12. A system as set forth in claim 9, at least some of the peripheral stations including means for storing items of monetary value and being operated in response to said acceptance signal for controlling dispensing of the item.

13. A communications system as set forth in claim 9, the first means including a keyboard.

14. A system as set forth in claim 9, at least some of the peripheral stations including means for receiving manifestations of a second account number, the third means including means for processing the first and third numbers to effect a transfer of funds from the secured account to the second account.

15. A system as set forth in claim 9, there being a plurality of central stations, at least some of the peripheral stations including means for selecting a particular one of the central stations for communication therewith.

16. A system as set forth in claim 15, said peripheral station including a store of addressing codes for addressing central stations of the plurality and including means for selecting a particular addressing code for causing the addressing of the particular central station.

17. A system as set forth in claim 15, the means for selecting in the peripheral stations including means for receiving an externally provided addressing code for addressing the particular central station.

18. A system as set forth in claim 9, at least some of the peripheral stations including means for receiving and displaying information from the central station on the updated credit balance.

19. A system as set forth in claim 9, the first means including a card reader for reading said first number and a fourth number from encodings on a card when presented to the reader, the peripheral station including means responsive to the fourth number to decide whether it can communicate with the central station as identified by the fourth number.

20. A system as set forth in claim 9, there being a plurality of different central stations, at least some peripheral stations including a card reader for reading said first number and a fourth number from encodings on a card when presented to the reader, the fourth number defining a particular central station of the plurality;

means in said peripheral stations responsive to the fourth number when read from the card to decide on communication with the particular central station.

21. In a system as set forth in claim 9, cooperating with cards having information erasably recorded as to at least one of said numbers, the peripheral station including means for reading the content of a card when presented.

22. A communication system for a plurality of peripheral stations and a central station physically remote from at least some of the peripheral stations particularly for gaining access to information comprising:

first means in each of the peripheral stations for accepting independently manifestations of first and second multidigit numbers, the first means including keying means for providing manifestations of distinguishing significance for the first and the second numbers, the first means being at least partially manually operable;

second means in each of the peripheral stations connected to be responsive to manifestations of the first and second numbers for transmitting signals representative thereof to said central station;

third means in said central station including data processing and memory means connected to be responsive to the transmitted signals and to absence or presence of a duplicate of the particular association of said first multidigit number and of said second multidigit number in the memory means, the third means providing second signals representative of absence or presence of said duplicate of number association;

fourth means connected for transmitting the second signals to the peripheral station which transmitted said signals; and fifth means in each of said peripheral stations responsive to the transmitted second signals as response information when having transmitted the first signals, and providing distinguishing indication representative of absence or presence of said duplicate number.

23. A system as in claim 1, the first and second means in at least some of the peripheral stations including a card reader for reading manifestations on a card to be interpreted as first number, further including a keyboard with digit keys and control keys, the digit keys for inputting the second and third numbers, the control keys for providing manifestations identifying an inputted number as security code number or as number of monetary significance.

24. A communication system as in claim 9, the input means including a digit keyboard for input keying of at least some of the numbers, including the second and third numbers, and further including first and second control keys respectively identifying numbers when keyed-in as security code number and number of monetary significance.

25. A communication system including at least one peripheral station, and at least one central station for remote control of financial transactions and selective linking with the peripheral station, the improvement comprising:

input key means in the peripheral station including digit keys for input keying of numbers, further including control keys to identify the identity of input keyed numbers including a first control key for identification for a first number representing a security code when keyed-in by the digit keys, and a second control key for separately identifying a second number of monetary significance, when keyed-in by the digit keys;

a card reader in the peripheral station for reading encoded information on a card when presented to the reader, the information representing account number information;

storage means in the peripheral station connected to the input key means and the card reader, for storing manifestation in representation of input keyed first and second numbers and of account numbers read from the card, including storage of manifestations of the distinctive significance of each of the numbers;

transmission means in the peripheral station operable connectable to the storage means for transmitting signals, representing the stored numbers, to the central station;

means in the central station connected for receiving the transmitted signals;

processor means in the central station including means (a) separating signals representing the security code from signals representing the account number information as received; means (b) for testing the association of the security code and account numbers as transmitted in relation to manifestations in memory of associations of individual ones of secured account numbers of the plurality and security code numbers of the plurality, means (c) for transmitting to the peripheral station a reject indicating signal in case of absence of a manifestation in the memory means of the association of the security code and account number as transmitted, means (d) operating in case of presence of said manifestation of association for processing signals transmitted in representation of second number in relation to credit information held in memory in association with the account defined by the account number as transmitted, means (e) for transmitting indicating signals to the peripheral station which at least impliedly include representation of presence of said manifestation of association; and means in the peripheral station responsive to said indication signals for providing an indication representative thereof.